United States Patent
Diao et al.

(10) Patent No.: US 9,977,761 B2
(45) Date of Patent: May 22, 2018

(54) VIRTUALIZING TCP/IP SERVICES WITH SHARED MEMORY TRANSPORT

(71) Applicant: INTERNATIONAL BUSINESS MACHINES CORPORATION, Armonk, NY (US)

(72) Inventors: Xian Feng Diao, Beijing (CN); Shuo Li, Beijing (CN); Xin Peng Liu, Beijing (CN); Meng Wan, Beijing (CN); Chong Yuan Yin, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/177,540

(22) Filed: Jun. 9, 2016

(65) Prior Publication Data

US 2017/0357613 A1    Dec. 14, 2017

(51) Int. Cl.
    *G06F 15/173*    (2006.01)
    *H04L 29/06*    (2006.01)

(52) U.S. Cl.
    CPC ........ *G06F 15/17331* (2013.01); *H04L 67/42* (2013.01); *H04L 69/16* (2013.01)

(58) Field of Classification Search
    CPC ............... G06F 9/45558; G06F 15/167; G06F 2009/45583; H04L 69/16
    See application file for complete search history.

(56) References Cited

U.S. PATENT DOCUMENTS

| | | | |
|---|---|---|---|
| 6,999,998 B2 | 2/2006 | Russell | |
| 7,356,679 B1 * | 4/2008 | Le | G06F 17/30067 707/E17.01 |
| 8,214,449 B2 | 7/2012 | Kim | |
| 8,683,047 B2 | 3/2014 | Han et al. | |
| 9,083,628 B2 | 7/2015 | Bryers et al. | |
| 9,313,191 B1 | 4/2016 | Allen et al. | |
| 9,529,996 B2 * | 12/2016 | Qureshi | G06F 21/53 |
| 2003/0069938 A1 * | 4/2003 | Russell | G06F 15/167 709/213 |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Shean S Tokuta
(74) *Attorney, Agent, or Firm* — Robert C. Bunker (57) ABSTRACT

A method for testing a client service locally using a shared memory transport is presented. The method may include recording a plurality of interactions between the client service located in a local host and a real server. The method may include generating a virtual server based on the recorded plurality of interactions. The method may include deploying the generated virtual server in the local host. The method may include executing the client service. The method may include receiving a TCP/IP request from the client service. The method may include converting the received TCP/IP request to a shared memory request. The method may include sending the shared memory request to the virtual server. The method may include receiving a shared memory reply from the virtual server. The method may include sending the shared memory reply to the client service.

14 Claims, 6 Drawing Sheets

(56) References Cited

U.S. PATENT DOCUMENTS

| | | | |
|---|---|---|---|
| 2003/0069939 A1* | 4/2003 | Russell | G06F 15/167 709/214 |
| 2004/0133718 A1* | 7/2004 | Kodama | G06F 3/0605 710/74 |
| 2009/0083756 A1* | 3/2009 | Kim | G06F 9/544 719/312 |
| 2011/0131289 A1* | 6/2011 | Kim | G06F 9/45558 709/213 |
| 2012/0221671 A1* | 8/2012 | Chen | G06F 15/167 709/213 |
| 2013/0232491 A1 | 9/2013 | Radhakrishnan et al. | |
| 2013/0332678 A1 | 12/2013 | Fitzpatrick et al. | |
| 2014/0146705 A1* | 5/2014 | Luxenberg | H04L 45/586 370/254 |
| 2014/0149490 A1* | 5/2014 | Luxenberg | G06F 15/00 709/203 |
| 2014/0149981 A1* | 5/2014 | Luxenberg | G06F 9/45533 718/1 |
| 2014/0282510 A1* | 9/2014 | Anderson | G06F 9/45558 718/1 |

OTHER PUBLICATIONS

Tatte, "Implementation of Shared Memory Based Communication in Collocated Virtual Machine," SYstems and NEtworks Research Group (SYNERG), 2010, 11 Pages, Indian Institute of Technology Bombay.

IBM, "List of IBM Patents or Patent Applications Treated as Related (Appendix P)," October 20, 2017, p. 1-2.

Diao et al., "Virtualizing TCP/IP Services With Shared Memory Transport," Application and Drawings, Filed on Jul. 31, 2017, 28 Pages, U.S. Appl. No. 15/664,903.

* cited by examiner

VIRTUALIZING TCP/IP SERVICES WITH SHARED MEMORY TRANSPORT

BACKGROUND

The present invention relates generally to the field of computing, and more particularly to virtual service testing.

Modern business systems have evolved into more complicated systems built on a variety of service components that interact with each other. Testing each service against one another is often necessary to ensure the quality of the whole system. Communication between services may utilize different communication protocols, such as Transmission Control Protocol/Internet Protocol (TCP/IP) and shared memory.

SUMMARY

According to one exemplary embodiment, a method for testing a client service locally using a shared memory transport is provided. The method may include recording a plurality of interactions between the client service located in a local host and a real server. The method may also include generating a virtual server based on the recorded plurality of interactions. The method may include deploying the generated virtual server in the local host. The method may then include executing the client service. The method may further include receiving a Transmission Control Protocol (TCP/IP) request from the executing client service. The method may also include converting the received TCP/IP request to a shared memory request. The method may then include sending the converted shared memory request to the virtual server. The method may further include receiving a shared memory reply from the virtual server. The method may also include sending the received shared memory reply to the client service.

According to another exemplary embodiment, a computer system for testing a client service locally using a shared memory transport is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include recording a plurality of interactions between the client service located in a local host and a real server. The method may also include generating a virtual server based on the recorded plurality of interactions. The method may include deploying the generated virtual server in the local host. The method may then include executing the client service. The method may further include receiving a Transmission Control Protocol/Internet Protocol (TCP/IP) request from the executing client service. The method may also include converting the received TCP/IP request to a shared memory request. The method may then include sending the converted shared memory request to the virtual server. The method may further include receiving a shared memory reply from the virtual server. The method may also include sending the received shared memory reply to the client service.

According to yet another exemplary embodiment, a computer program product for testing a client service locally using a shared memory transport is provided. The computer program product may include one or more computer-readable storage devices and program instructions stored on at least one of the one or more tangible storage devices, the program instructions executable by a processor. The computer program product may include program instructions to record a plurality of interactions between the client service located in a local host and a real server. The computer program product may also include program instructions to generate a virtual server based on the recorded plurality of interactions. The computer program product may then include program instructions to deploy the generated virtual server in the local host. The computer program product may further include program instructions to execute the client service. The computer program product may also include program instructions to receive a Transmission Control Protocol/Internet Protocol (TCP/IP) request from the executing client service. The computer program product may then include program instructions to convert the received TCP/IP request to a shared memory request. The computer program product may further include program instructions to send the converted shared memory request to the virtual server. The computer program product may also include program instructions to receive a shared memory reply from the virtual server. The computer program product may then include program instructions to send the received shared memory reply to the client service.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for testing Transmission Control Protocol/Internet Protocol (TCP/IP) services using shared memory transport protocols. As such, the present embodiment has the capacity to improve the technical field of virtual service testing by simulating TCP/IP communication to a remote service using a local service through shared memory transport. More specifically, real service interactions are recorded and then a virtual server is deployed locally to simulate a remote service. Thereafter, a policy agent is installed and TCP/IP requests to the virtual server are converted into shared memory requests and then routed to the virtual server. After the virtual server accepts and processes the request, the response is routed back to a client using the shared memory protocol.

As described previously, modern business systems have evolved into more complicated systems built on a variety of service components that interact with each other. Testing each service against one another is often necessary to ensure the quality of the whole system. Communication between services may utilize different communication protocols, such as TCP/IP and shared memory. Shared memory may be advantageous due to the speed at which communication may occur, thus allowing a single server to communicate with multiple clients in both directions. However, shared memory protocol may only be used within a single physical machine; as such, all processes using shared memory may only run on the same computer. Many software products use the TCP/IP protocol since the TCP/IP protocol allows for communication between different physical computers (communication between different peers). TCP/IP may add complications, resulting in the expenditure of many resources for processing data exchanges. When testing clients that communicate via TCP/IP protocols with one or more remote services (i.e., services running on a separate physical server), not all of the services necessary to complete the test may be available. Therefore, it may be advantageous to, among other things, provide a way to test a client service by simulating client TCP/IP communication with a real service on a remote server through the use of shared memory transport communication with a virtual service running on the same local host as the client.

According to at least one embodiment, a remote (in another physical machine from the client) TCP/IP service may be emulated using a local (in the same physical machine with the client) service through shared memory transport. At the start, TCP/IP packets may be recorded and extracted from recorded requests/responses from a client to a remote real service. Then, the data payload from TCP/IP packet may be extracted and converted into a shared memory request. A local simulation service may also be generated based on the TCP/IP service, whereby the simulation service may interact with the client using shared memory transport to process the converted shared memory request. Thereafter, new TCP/IP requests may be intercepted dynamically and converted from a TCP/IP request into a shared memory request and routed to the previously generated simulation service for integration testing through a policy agent. Thus, the conversion to a shared memory request may be transparent to a client service under test while taking advantage of the benefits of shared memory instead of using TCP/IP.

Client TCP/IP exchanges between the client and the real service to be simulated (or virtualized) may be recorded for use in later virtual testing. Since the virtual testing may be localized within the client system, only the real server running the real service may need to be virtualized on the client-side system for local testing. A simulated service, or simulated server, may be generated to simulate the behavior of the real service to eliminate system test dependencies and reduce setup and infrastructure costs associated with traditional testing environments. A virtual server may be created and the generated virtual server may subscribe to incoming shared memory requests dispatched from a policy agent of a client. Additionally, the virtual server may send the response directly to the clients using shared memory communication. As such, the virtual server may be deployed and enabled first to provide the virtual service in the virtual server locally, similarly to how the real service runs locally within the real server.

The policy agent running on the client may convert the incoming TCP/IP request to a shared memory request and operate as a client router to dispatch the converted request to the virtual server using shared memory transport. According to at least one embodiment, the conversion may only be used to convert incoming TCP/IP requests to shared memory requests. According to at least one other embodiment, the outgoing shared memory request from the virtual server to the client may be converted back into a TCP/IP request. TCP/IP data packet requests (and responses) follow TCP standards to append a data segment to a TCP header and encapsulate the header/data segment into an Internet Protocol (IP) datagram for exchanging between peers. By leveraging the TCP/IP format, the IP encapsulation and TCP header may be removed from the data segment payload. Thereafter, the data payload may be converted into a shared memory format for use within the virtualized testing environment on the client. Shared memory may be efficient to perform reading and writing since shared memory operations are based on regular operating system services running on the client. For example, using a designated area of shared memory on the client, data can be made directly accessible to both sides (i.e., client and virtual server) without having to use traditional system devices (e.g., modem or network adapters) for reading and writing operations. In many testing scenarios, virtual testing exchanges may be the same data format as the requests recorded previously, such as TCP/IP datagrams (i.e., packages). Thus, requests may be strictly encapsulated according to the defined TCP/IP format. However, the policy agent installed on the client may be used to convert data formatted as TCP/IP packages sent from the client nodes to a shared memory (SHM) package structure.

The data payload converted from TCP/IP to SHM may then be dispatched to the corresponding virtual server via shared memory transport to peers. Dispatching may be performed by a client router within the policy agent on the client. Furthermore, by identifying the SHM segment header in the converted data package, the client router may identify the virtual server that the converted request should be sent. Once the destination virtual server is identified, the SHM request may be sent be the client router via shared memory transport to a server router. After receiving the request data from shared memory transport, the server router may dispatch the SHM request to the virtual server. A SHM response may also be sent back to the client in similar fashion from the virtual service.

Figure 1:
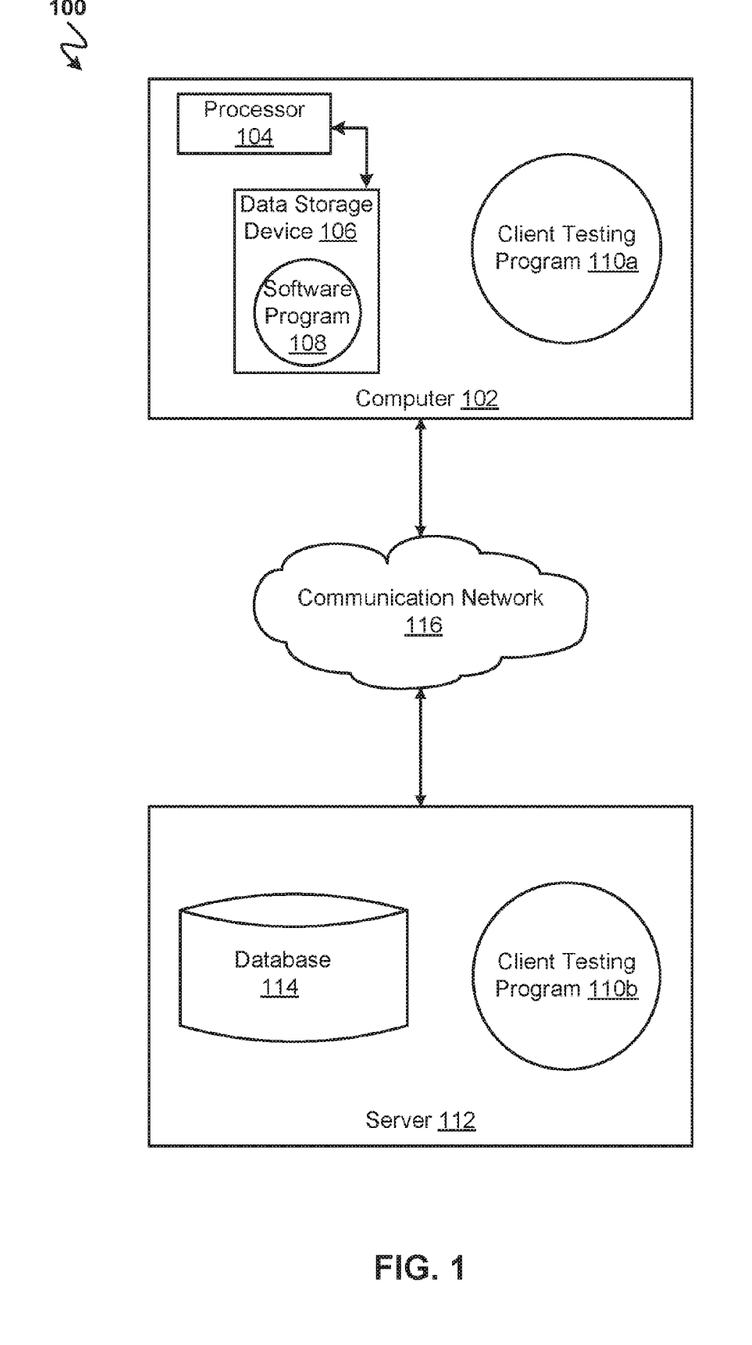
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a client testing program 110a. The networked computer environment 100 may also include a server 112 that is enabled to run a client testing program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the client testing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the client testing program 110a, 110b (respectively) to test client services designed to communicate via TCP/IP with remote services in a local testing environment with virtual services using shared memory transport. The client testing program 110a, 110b is explained in more detail below with respect to FIGS. 2 and 3.

Figure 2:
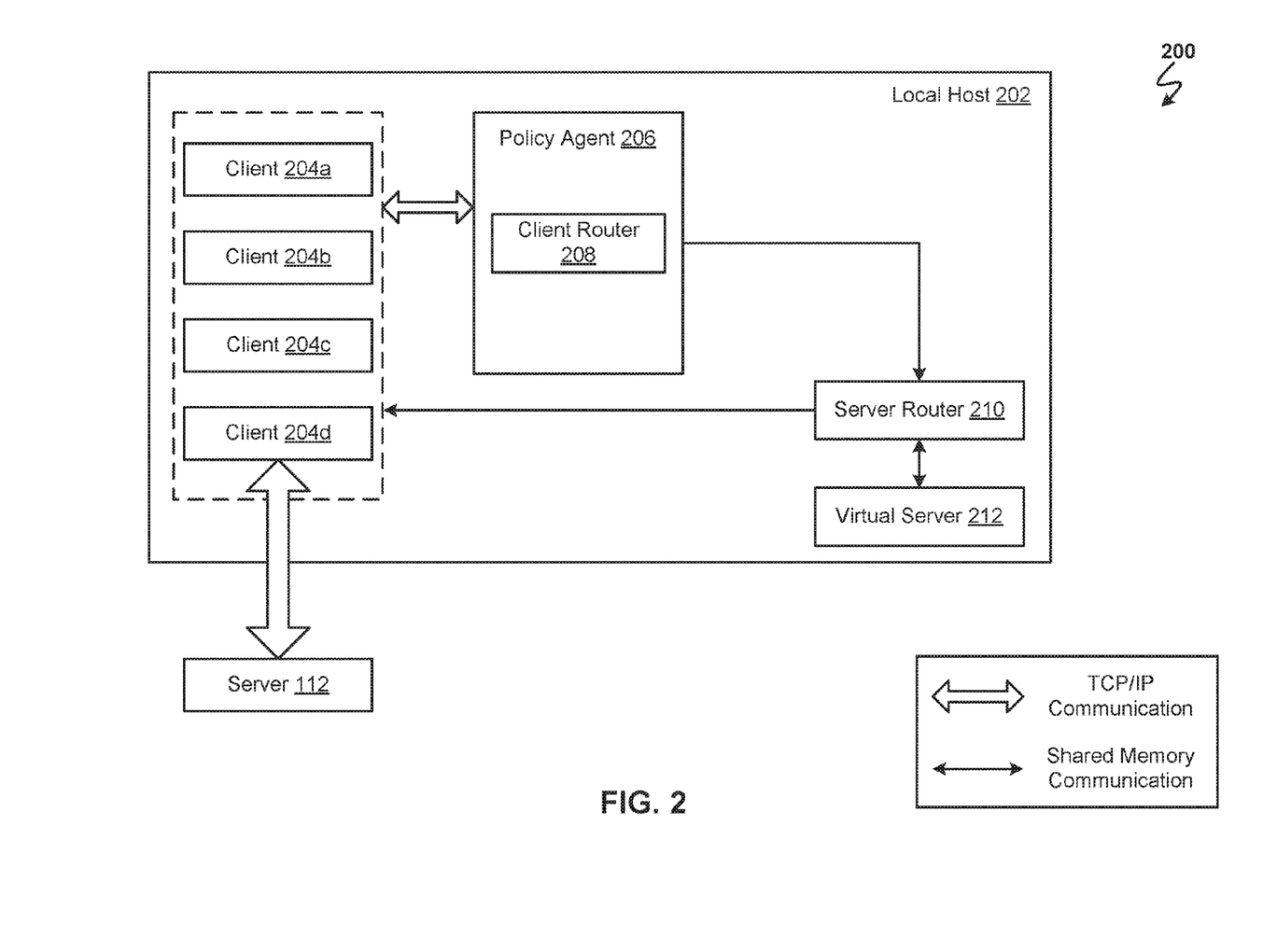
FIG. 2 is a block diagram of a local client service testing system according to at least one embodiment.

Referring now to FIG. 2, a block diagram of a local client service testing system 200 according to at least one embodiment is depicted. The local client testing system 200 may include a local host 202 (e.g., client computer 102) that conducts virtualized testing by simulating the behavior of remote servers 112 communicating with client 204a-d services over a communication network 116 using TCP/IP packages. The local host 202 may include the clients 204a-d, a policy agent 206 that runs the client router 208, a server router 210, and a virtual server 212 that simulates the server 112.

Clients 204a-d under test within the local host 202 may communicate with the real server 112 using TCP/IP exchanges. The TCP/IP requests and responses between the clients 204a-d and the server 112 may be recorded and a virtual server 212 may be generated and deployed within the local host 202. Additionally, a policy agent 206 may be deployed in the local host 202. The policy agent 206 may handle converting the TCP/IP requests from the clients 204a-d into shared memory (SHM) requests. Based on the TCP/IP header information, the client router 208 within the policy agent 206 may determine the destination virtual server 212 and route the SHM request to the destination virtual server 212 or server router 210. Once the converted SHM request is dispatched from the client router 208, the server router 210 may route the SHM request to the virtual server 212. Thereafter, the virtual server 212 may send a response using SHM to the server router 210. The server router 210 may then route the SHM response to the proper client 204a-d.

Figure 3:
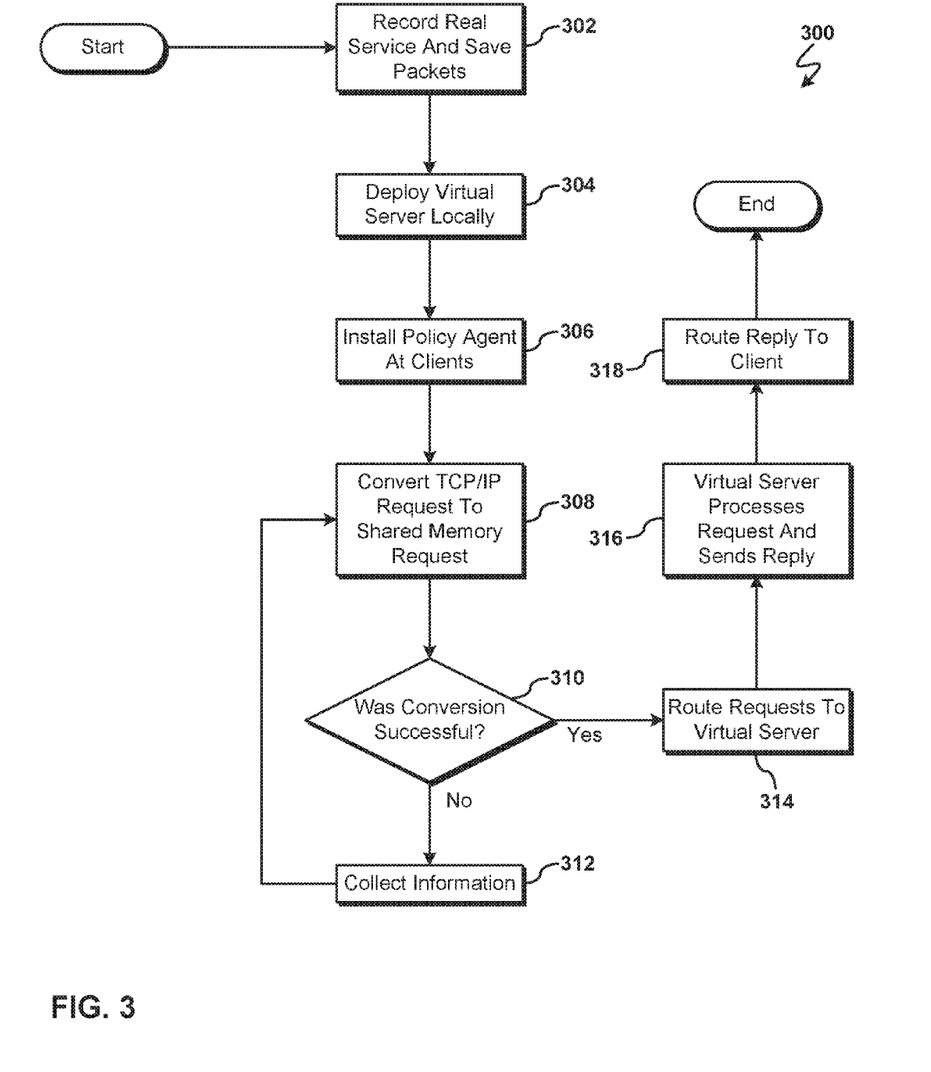
FIG. 3 is an operational flowchart illustrating a process for TCP/IP to shared memory communication according to at least one embodiment.

Referring now to FIG. 3, an operational flowchart illustrating the exemplary TCP/IP to shared memory communication process 300 used by the client testing program 110a and 110b according to at least one embodiment is depicted.

At 302, interaction between clients 204a-d and a real service running on the server 112 is recorded and copies of the TCP/IP packets exchanged are saved. A record component program (e.g., software program 108) may be deployed on the local host 202 to record TCP/IP packets exchanged (i.e., request and reply interactions) between the client 204a-d and the server 112 using known methods. For example, if clients 204a-d communicate with a service on server 112 using TCP/IP packets, the record component may read the data within packets being transmitted from the client 204a-d services to the server 112 and packets transmitted to one of the client 204a-d services from the server 112. Furthermore, the record component may record copies of the packet data in a data repository, such as a database 114 or a data storage device 106.

Next, at 304, a virtual server 212 is generated and deployed locally within the local host 202. Based on the data packet interactions recorded previously at 302, a virtual server 212 may be generated that may simulate the behavior of the server 112 using known virtualized service generation methods. The virtual server 212 may then be deployed within the local host 202, thus virtual testing may be carried out within local host 202. Complications from using a real system (i.e., server 112) may be avoided since the virtual testing only relies on the local host 202. The virtual server 212 may behave equivalent to the real server 112 based on the packet exchanges recorded, thus using the real server 112 may not be needed to conduct testing of the client 204a-d services. Additionally, a server router 210 may be installed to route requests to the virtual server 212 and to route responses from the virtual server 212 to the proper client 204a-d.

Then, at 306, after the virtual server 212 is active, a policy agent 206 is installed within the local host 202. The policy agent 206 may perform two functions: convert TCP/IP requests to shared memory (SHM) requests and route the converted SHM requests to the virtual server 212. The policy agent 206 may be initialized with access to receive TCP/IP requests sent by the clients 204a-d that are destined for one or more virtual servers 212. Additionally, the policy agent 206 may include a client router 208 that may be connected with shared memory access to the server router 210 or the deployed virtual server 212 directly. For example, in a local host 202 with clients 204a-d, the policy agent 206 may be installed and initialized to receive TCP/IP requests sent by the clients 204a-d. If the client 204a sends a TCP/IP request destined for the virtual server 212, the policy agent 206 may receive the TCP/IP request from client 204a. Once the virtual server 212 and the policy agent 206 have been installed and configured, the clients 204a-d under test may begin execution. At the start of testing, the clients 204a-d may generate and send out TCP/IP requests for processing by the virtual server 212.

At 308, TCP/IP requests are converted to SHM requests by the policy agent 206. TCP/IP data packet requests (and responses) following TCP standards add header data to the data segment payload (e.g., a read request) and then encapsulate the header/data segment into an Internet Protocol (IP) datagram for exchanging between peers (e.g., the client 204d and server 112). By leveraging the defined TCP/IP format, the IP and TCP headers may be identified and removed from the data segment payload by the policy agent 206, thereby extracting the data payload. Then, the data payload may be converted into a SHM format for use within the local host 202 to communicate with the virtual server 212 by adding a SHM header to the data payload. The SHM header may be generated based on analyzing the removed TCP/IP header information. Thus, the TCP/IP header information may be used to generate the SHM header.

For example, client 204a may send a read request in a TCP/IP package destined for the virtual server 212 to perform a read operation. The TCP/IP request may be received by the policy agent 206 from client 204a, whereupon receiving the TCP/IP packet, the policy agent 206 may identify the read request data payload from the TCP/IP headers. Then, the policy agent 206 may extract the read request data payload from the TCP/IP packet and analyze the TCP/IP headers to generate a SHM header. Finally, the generated SHM header may be added to the extracted read request data payload to complete the conversion from a TCP/IP read request to a SHM read request.

Next, at 310, the client testing program 110a and 110b determines if the TCP/IP to SHM conversion was successful. Successful TCP/IP to SHM package conversion may be determined using known methods. For example, the data payload in the SHM request may be compared with the original TCP/IP request to determine that the data payload has not changed. According to at least one embodiment, a user may customize the recorded payload data (e.g., after the TCP/IP packets are recorded and before client testing begins) for testing purposes. When the user has customized the payload data, a successful TCP/IP to SHM conversion may be determined when the customized payload data is accurately reflected in the converted SHM request.

If the client testing program 110a and 110b determines that the TCP/IP to SHM conversion was not successful at 310, then information relating to the request is collected at 312 for retrying the conversion from TCP/IP to SHM. Information relating to the TCP/IP request may be collected, for example, by having the client 204a-d resend the request or by prompting a user to supply more payload customization data. After the information relating to the request is collected, the TCP/IP conversion is performed again at 308.

However, if the client testing program 110a and 110b determines that the TCP/IP to SHM conversion was successful at 310, then the converted SHM request is routed to the virtual server 212 at 314. The converted SHM request may be dispatched by shared memory transport to the corresponding virtual server 212 by the policy agent 206. Dispatching may be performed by the client router 208 within the policy agent 206. The client router 208 may identify the destination virtual server 212 by analyzing the SHM segment header in the converted request. Once the destination virtual server 212 is identified, the SHM request may be sent by the client router 208 via a shared memory transport channel to the server router 210. Thereafter, the server router 210 may route the SHM request to the virtual server 212.

Then, at 316, the virtual server 212 processes the SHM request and sends a SHM reply. Once the virtual server 212 receives the SHM request via the shared memory transport, the virtual server 212 within the local host 202 may process the SHM request according to the logic the virtual server 212 was generated to simulate (i.e., a service on the real server 112). After processing the SHM request, the virtual server 212 may generate a reply for a client 204a-d in a SHM format. For example, if a converted SHM read request is received by the virtual server 212 from client 204a, the virtual server 212 may perform the requested read operation using a SHM call and use the resulting read data to generate a SHM reply for client 204a.

At 318, the SHM reply is routed to the client 204a-d. The virtual server 212 may send the SHM reply to the server router 210, and the server router 210 may in turn send the SHM reply directly to client 204a using shared memory transport. According to at least one embodiment, the server router 210 may send the SHM reply to the client router 208, and the client router 208 may send the SHM reply to the client 204a-d. According to at least one other embodiment, if the SHM reply is sent to the client router 208, then the policy agent 206 may convert the SHM reply into a TCP/IP reply and the client router 208 may deliver the converted TCP/IP reply to the client 204a-d.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
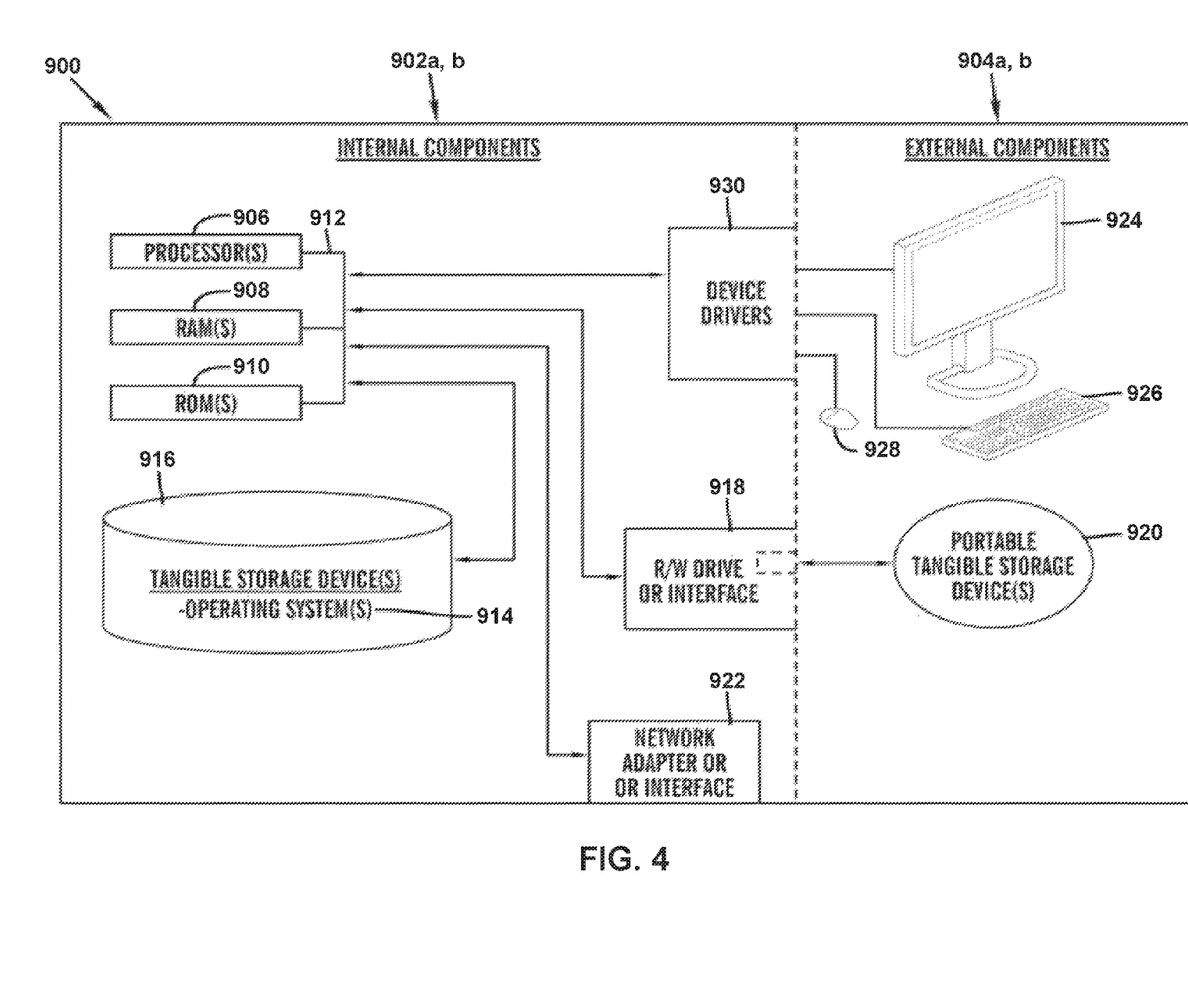
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108, and the client testing program 110a in client computer 102, and the client testing program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the client testing program 110a and 110b, can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the client testing program 110a in client computer 102 and the client testing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the client testing program 110a in client computer 102 and the client testing program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
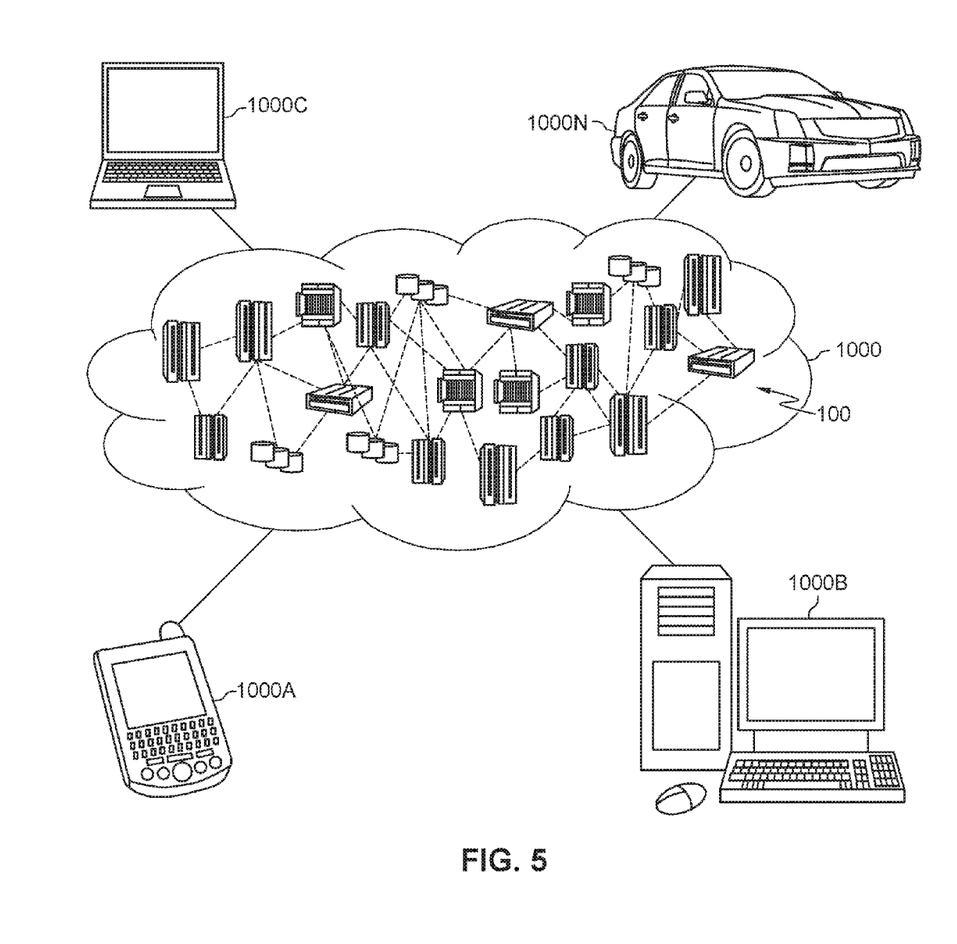
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
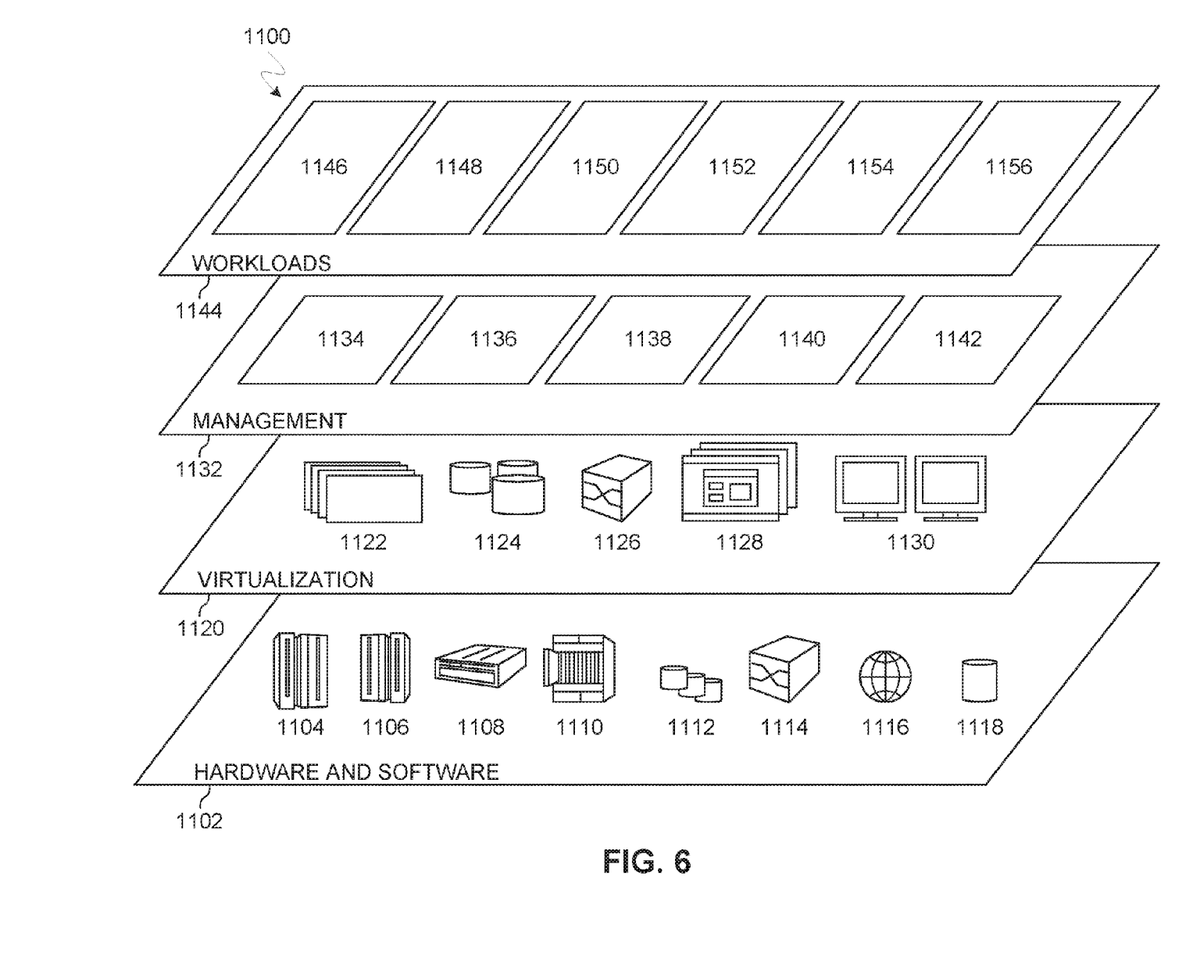
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and client testing 1156. A client testing program 110a, 110b provides a way to test client services designed to communicate via TCP/IP with remote services in a local testing environment with virtual services using shared memory transport.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a client service locally using a shared memory transport, the method comprising:
   recording a plurality of interactions between the client service located in a local host and a real server;
   generating a virtual server based on the recorded plurality of interactions; deploying the generated virtual server in the local host; executing the client service;
   receiving a Transmission Control Protocol/Internet Protocol (TCP/IP) request from the executing client service;
   converting the received TCP/IP request to a shared memory request; sending the converted shared memory request to the virtual server; receiving a shared memory reply from the virtual server;
   and sending the received shared memory reply to the client service;
   wherein converting the received TCP/IP request to a shared memory request further comprises:
   identifying a TCP header, an IP header, and a data payload;
   extracting the data payload from the TCP header and the IP header;
   generating a shared memory header based on the received TCP/IP request;
   and generating the shared memory request by appending the data payload to the shared memory header;
   wherein sending the converted shared memory request to the virtual server further comprises:
   installing a client router associated with the installed policy agent;
   identifying the virtual server as a shared memory request destination; and
   sending the converted shared memory request to the identified virtual server.

2. The method of claim 1, wherein the plurality of interactions comprises at least one TCP/IP request and at least one TCP/IP reply.

3. The method of claim 1, wherein sending the received shared memory reply to the client service comprises sending the received shared memory reply via the shared memory transport to the client service.

4. The method of claim 1, wherein sending the received shared memory reply to the client service comprises sending the received shared memory reply to the installed client router, and wherein the installed client router sends the received shared memory reply to the client.

5. The method of claim 1, wherein sending the received shared memory reply to the client service further comprises: sending the received shared memory reply to the installed client router; converting the received shared memory reply to a TCP/IP reply; and sending the converted TCP/IP reply to the client.

6. A computer system for testing a client service locally using a shared memory transport, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
recording a plurality of interactions between the client service located in a local host and a real server;
generating a virtual server based on the recorded plurality of interactions; deploying the generated virtual server in the local host; executing the client service;
receiving a Transmission Control Protocol/Internet Protocol (TCP/IP) request from the executing client service;
converting the received TCP/IP request to a shared memory request; sending the converted shared memory request to the virtual server; receiving a shared memory reply from the virtual server; and
sending the received shared memory reply to the client service;
wherein converting the received TCP/IP request to a shared memory request further comprises:
identifying a TCP header, an IP header, and a data payload;
extracting the data payload from the TCP header and the IP header;
generating a shared memory header based on the received TCP/IP request;
and generating the shared memory request by appending the data payload to the shared memory header;
wherein sending the converted shared memory request to the virtual server further comprises:
installing a client router associated with the installed policy agent;
identifying the virtual server as a shared memory request destination;
and sending the converted shared memory request to the identified virtual server.

7. The computer system of claim 6, wherein the plurality of interactions comprises at least one TCP/IP request and at least one TCP/IP reply.

8. The computer system of claim 6, wherein sending the received shared memory reply to the client service comprises sending the received shared memory reply via the shared memory transport to the client service.

9. The computer system of claim 6, wherein sending the received shared memory reply to the client service comprises sending the received shared memory reply to the installed client router, and wherein the installed client router sends the received shared memory reply to the client.

10. The computer system of claim 6, wherein sending the received shared memory reply to the client service further comprises:
sending the received shared memory reply to the installed client router; converting the received shared memory reply to a TCP/IP reply; and sending the converted TCP/IP reply to the client.

11. A computer program product for testing a client service locally using a shared memory transport, comprising:
one or more non-transitory computer-readable storage medium and program instructions stored on at least one of the one or more tangible storage medium, the program instructions executable by a processor, the program instructions comprising:
program instructions to record a plurality of interactions between the client service located in a local host and a real server;
program instructions to generate a virtual server based on the recorded plurality of interactions;
program instructions to deploy the generated virtual server in the local host; program instructions to execute the client service;
program instructions to receive a Transmission Control Protocol/Internet Protocol (TCP/IP) request from the executing client service;
program instructions to convert the received TCP/IP request to a shared memory request; program instructions to send the converted shared memory request to the virtual server; program instructions to receive a shared memory reply from the virtual server; and program instructions to send the received shared memory reply to the client service;
wherein converting the received TCP/IP request to a shared memory request further comprises:
program instructions to identify a TCP header, an IP header, and a data payload;
program instructions to extract the data payload from the TCP header and the IP header;
program instructions to generate a shared memory header based on the received TCP/IP request; and
program instructions to generate the shared memory request by appending the data payload to the shared memory header;
wherein sending the converted shared memory request to the virtual server further comprises:
program instructions to install a client router associated with the installed policy agent;
program instructions to identify the virtual server as a shared memory request destination;
and
program instructions to send the converted shared memory request to the identified virtual server.

12. The computer program product of claim 11, wherein the plurality of interactions comprises at least one TCP/IP request and at least one TCP/IP reply.

13. The computer program product of claim 11, wherein sending the received shared memory reply to the client service comprises sending the received shared memory reply via the shared memory transport to the client service.

14. The computer program product of claim 11, wherein sending the received shared memory reply to the client service comprises sending the received shared memory reply to the installed client router, and wherein the installed client router sends the received shared memory reply to the client.

* * * * *